(12) United States Patent
Dusenberry et al.

(10) Patent No.: US 7,840,991 B2
(45) Date of Patent: Nov. 23, 2010

(54) IN-THEATRE INTERACTIVE ENTERTAINMENT SYSTEM

(76) Inventors: Thomas Dusenberry, 5 Orchard St., Marblehead, MA (US) 01945; Joel Kaplan, 235 Jackson St., Newton, MA (US) 02459; Mark Rowntree, 39 Oakland Rd., Brookline, MA (US) 02445; Donald C. Miffitt, 44 Thomas Dr., Chelmsford, MA (US) 01824; Stephen S. Richardson, 10-2 Gorham St., Waltham, MA (US) 02453-8604; Yeasah G. Pell, 75 Pine St., #2, Dedham, MA (US) 02026

( * ) Notice: Subject to any disclaimer, the term of this patent is extended or adjusted under 35 U.S.C. 154(b) by 1630 days.

(21) Appl. No.: 10/638,831

(22) Filed: Aug. 11, 2003

(65) Prior Publication Data

US 2005/0039210 A1 Feb. 17, 2005

(51) Int. Cl.
 *H04N 7/16* (2006.01)
(52) U.S. Cl. .................. 725/153; 463/41; 455/517
(58) Field of Classification Search ........... 725/153; 463/40–42
 See application file for complete search history.

(56) References Cited

U.S. PATENT DOCUMENTS

| | | | | |
|---|---|---|---|---|
| 4,477,069 | A | | 10/1984 | Crudgington, Jr. ............. 272/3 |
| 4,771,344 | A | | 9/1988 | Fallacaro et al. ............. 358/335 |
| 4,866,515 | A | | 9/1989 | Tagawa et al. ............. 358/86 |
| 4,976,438 | A | | 12/1990 | Tashiro et al. ............. 273/313 |
| 5,035,422 | A | * | 7/1991 | Berman ............. 463/18 |
| 5,213,555 | A | | 5/1993 | Hood et al. ............. 482/57 |
| 5,215,464 | A | | 6/1993 | Marshall et al. ............. 434/22 |
| 5,480,158 | A | | 1/1996 | Schulze et al. ............. 273/434 |
| 5,618,045 | A | | 4/1997 | Kagan et al. ............. 463/40 |
| 5,835,715 | A | | 11/1998 | Dahl ............. 395/200.39 |
| 5,846,132 | A | * | 12/1998 | Junkin ............. 463/42 |
| 5,999,808 | A | * | 12/1999 | LaDue ............. 455/412.2 |
| 6,056,640 | A | | 5/2000 | Schaaij ............. 463/4 |
| 6,088,429 | A | * | 7/2000 | Garcia ............. 379/88.22 |
| 6,257,982 | B1 | * | 7/2001 | Rider et al. ............. 463/31 |
| 6,346,045 | B2 | * | 2/2002 | Rider et al. ............. 463/31 |
| 6,554,707 | B1 | * | 4/2003 | Sinclair et al. ............. 463/39 |
| 6,760,595 | B2 | * | 7/2004 | Inselberg ............. 455/517 |
| 6,893,347 | B1 | * | 5/2005 | Zilliacus et al. ............. 463/41 |
| 2002/0142825 | A1 | | 10/2002 | Lark et al. ............. 463/16 |
| 2003/0073471 | A1 | | 4/2003 | Varley ............. 463/1 |
| 2003/0073472 | A1 | | 4/2003 | Varley ............. 463/1 |

(Continued)

FOREIGN PATENT DOCUMENTS

EP 0 631 247 B1 9/2001

(Continued)

*Primary Examiner*—Andrew Y Koenig
*Assistant Examiner*—Anthony Bantamoi
(74) *Attorney, Agent, or Firm*—Choate, Hall & Stewart, LLP

(57) ABSTRACT

In-theater interactive entertainment system. A game server generates video content in digital form and is displayed on a digital display in a theater. A telephony system is connected to the game server enabling a group of individual game participants in the theater to exchange data wirelessly with the game server so that the game participants can interact with video content on the display. It is preferred that at the display is a reflective screen illuminated by a digital projector.

25 Claims, 1 Drawing Sheet

U.S. PATENT DOCUMENTS

| | | | |
|---|---|---|---|
| 2003/0074665 A1 | 4/2003 | Varley | 725/78 |
| 2003/0216185 A1* | 11/2003 | Varley | 463/42 |
| 2003/0228902 A1* | 12/2003 | Walker et al. | 463/25 |
| 2004/0116183 A1 | 6/2004 | Prindle | 463/42 |
| 2004/0152505 A1 | 8/2004 | Herrmann et al. | 463/16 |
| 2005/0176491 A1 | 8/2005 | Kane et al. | 463/19 |

FOREIGN PATENT DOCUMENTS

| | | |
|---|---|---|
| WO | WO 01/67760 A1 | 9/2001 |
| WO | WO 02/077935 A2 | 10/2002 |
| WO | WO 03/033094 A1 | 4/2003 |
| WO | WO 2004/053806 A2 | 6/2004 |

* cited by examiner

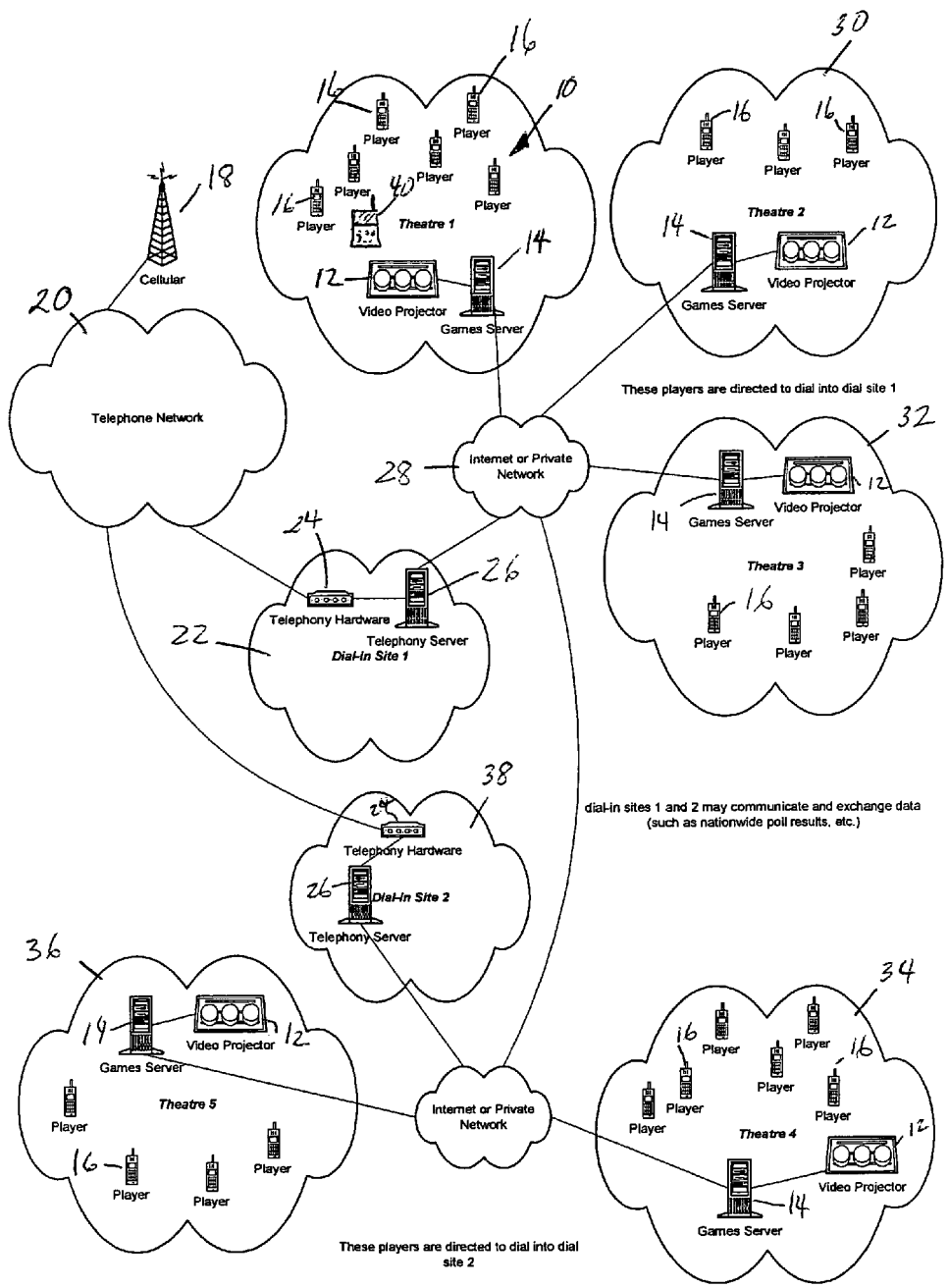

IN-THEATRE INTERACTIVE ENTERTAINMENT SYSTEM

BACKGROUND OF THE INVENTION

This invention relates to an entertainment system, and more particularly, to an interactive entertainment system for use in theaters.

As the pace of life continues to accelerate in the $21^{st}$ century, people become very restless and bored while sitting in a movie theater waiting for the previews and feature presentation to begin. Some movie theatres fill this time period with a static slide show including movie trivia questions, intermingled with commercial announcements.

It is also the case that a generation of movie viewers has grown up with video game experience in which the game player actively controls video content. Members of this generation often find the movie experience too passive and would like to have the opportunity to influence what appears on the screen.

The ubiquity of wireless cellular phones, the internet, movie digital projection and interactive entertainment content allows their integration into the novel in-theatre interactive entertainment system disclosed herein.

SUMMARY OF THE INVENTION

The in-theater interactive entertainment system according to one aspect of the invention includes a game server to generate video content in digital form and a digital display in a theater for displaying the video content from the game server. The video content is preferably dynamic video content. The game server is connected to a telephony system and enables a plurality of individual game participants in the theater to exchange data wirelessly with the game server to affect on-screen video content. Software running on the game server and the telephony system enables the game participants to interact with the video content on the display. In a preferred embodiment, the display is a screen illuminated by a digital projector. In this embodiment, the telephony system includes a cellular telephone network interacting with a telephony server and the telephony server is connected so as to be able to exchange data with the game server. The game server may be connected to the telephony system through a private network or through the internet. It is preferred that the individual game participants use their own cellular telephones to access the cellular telephone network and interact with of the entertainment system.

In a preferred embodiment, the telephony system includes a telephony server programmed for receiving telephone calls from the individual game participants and for exchanging data in real time with the game server. The telephony server accepts input from the game participants via DTMF signals, and it is contemplated that the telephony server may also include speech recognition capability so as to accept inputs from the game participants via game participant speech. The telephony system includes telephony hardware to connect the telephony server to a plurality of telephone lines.

In another aspect, the invention includes at least one additional theater having the in-theater entertainment system of the invention. The additional theater or theaters may be in different cities and are connected to exchange data with one another.

In yet another aspect, individual game participants use wireless PDA's or wireless game devices to exchange data with the game server directly without using a public telephone network.

The present invention enables many in-theater interactive entertainment applications. For example, movie story branching capability allows the audience to determine the direction of the story. Another important application is pre-movie entertainment that may include sponsorship-driven movie games, market research polling, theater interactive shopping, political/trend polling, or drama-based branching advertising. The technology disclosed herein can also be used to expand usage of movie theatres during non-movie viewing periods. For example, the system of the invention can be utilized for local/national competitions, sports leagues, movie premiers, market research events, and sponsorship/promotional events at times when the movie theater would otherwise be dark.

As an example, the pre-movie interactive entertainment might begin 15 minutes before the beginning of previews with 5 minutes for each of game introduction, set-up, communications, and closing. Typical games embedded in sponsors' brand messages might include trivia games, polling, drama, puzzles, sports, and strategy and may include audience status updates during the game. There may also be public service announcements.

BRIEF DESCRIPTION OF THE DRAWING

The single FIGURE of the drawing is a schematic illustration of the interactive entertainment system according to one embodiment of the invention.

DESCRIPTION OF THE PREFERRED EMBODIMENT

The in-theater interactive entertainment system of this invention is a new technology platform that combines and showcases several media—digital movie projection, wireless phones, the internet (or private network), and entertainment content. The system of the invention is unique in several aspects. First of all, it allows the audience actually to interact with the movie screen, and enables multimedia content with embedded sponsorship in a movie theater. The present system is the first interactive entertainment system that uses mobile telephone networks within movie theaters. As will be discussed below in more detail, audience members who wish to interact with the system of the invention use their personal wireless phones, call a toll free number, and actually play the game on a movie screen. The "magic" occurs for the audience when the movie screen starts interacting with the audience players while they are in the theater. In addition, participants may be sent a congratulatory text/voice message on their cellphone. The system will use both multi-media elements from digital projectors and wireless phones. The wireless phones' audio capability will be used to prompt participants so as to provide a personalized audio experience. The in-theater participant will be provided with fact-based responses, polling responses, drama-based storyline responses, and many other ways to interact with the movie theater content.

With reference now to the single figure of the drawing, a first theatre 10 is a modern movie theater with a digital projector 12 under the control of a games server 14. Members of the audience who wish to participate in the interactive entertainment of the invention each have a cellphone 16 which communicates via a cellular tower 18 to a public telephone network 20. The telephone network 20 in turn is connected to a dial-in site 22 that includes telephony hardware 24 under the control of a telephony server 26. The telephony server 26 is connected to the game server 14 through a network 28 which may be a private network or the internet. Similarly, there may be additional theaters 30, 32, 34, and 36 along with an additional dial-in site 38. The five theaters illustrated in the figure are merely exemplary as it will be understood that any number of theaters may be interconnected. Further, there may be any number of dial-in sites as necessary to support the system of the invention.

As described earlier, a member of the audience who wishes to participate uses his or her cellphone 16 to connect to the telephony server 26 through the public telephone network 20 utilizing the cell tower 18. The telephony server 26 is a highly reliable computer(s) located in a central site or several sites, as shown in the figure. The telephony server 26 is responsible for taking phone calls from the game participants much in the same way as automatic voice services do (such as weather, movie, show times, etc.) As shown in the figure, the telephony server 26 is connected to, and exchanges data in near real-time with, the game server 14 that is preferably installed in the movie theater 10. Those skilled in the art will appreciate that the game server 14 need not actually be located in the theater 10 but could be located in a separate facility. The telephony server 26 takes input from game participants (via DTMF keypad signals) and prompts and immerses the players using pre-recorded audio content in synchrony with on-screen activity within the theater 10. It is also contemplated that the telephony server 26 be capable of voice recognition so as to allow game participants to speak in addition to using the keypad to interact with the game server 14. It is expected that voice recognition will further enrich the game experience.

The telephony hardware 24 connects the telephony server 26 to a number of telephone lines, which may be, for example, POTS lines, digital T1 or T3 lines, or other techniques for connecting through a cellular network 20. The telephony hardware 24 provides the capability for the telephony server 26 to direct pre-recorded or synthesized audio (speech or music) to the game participant in order to deliver to them individualized audio content in a non-intrusive way (i.e., other theater attendees are not bothered by those participating in the game). Additionally, the telephony hardware 24 interprets DTMF signals generated by keypad presses. The telephony hardware 24 optionally may also offer the capability of recording the participant's voice (much like voicemail), possibly for acquiring a name/address for prizes and the like. In a preferred embodiment, the telephony system 22 is able to perform voice recognition on words spoken by game participants. In such a case, the telephony hardware 24 samples the incoming audio from a telephone line and allows it to be analyzed by a voice recognition algorithm.

The game server 14 is a high-reliability computer preferably located in the movie theaters. The game server computer 14 is connected to a digital projector 12. The game server 14 generates the video content shown on the screen in the theater including animation, text, etc. For some interactive experiences, it will be desirable for the game server 14 to produce high quality, multi-channel audio, which can be directed to the theater audio system creating an even richer experience.

The game server 14 connects to the telephony server 26 by way of a modem and phone line or a higher-bandwidth connection such as ISDN, DSL, cable modem, T1, etc. The game server 14 functionality may be integrated with existing computers used for projecting static advertising content if desired. Alternatively, the game server 14 of this invention can also perform the function of static advertising if desired. Such integration has an added benefit of making it more economical and space-efficient in the projection booth, and simplifies connection to the projection system (possibly eliminating costly or complex switching systems).

The implementation of content on the game server 14 may be in a convenient environment. One suitable environment is Macromedia Flash MX, which provides rich graphics, animation, and sound capabilities coupled with TCP/IP and XML support making the logical network connection to the telephony servers 26 relatively easy to implement. An additional benefit of Macromedia Flash MX is the large talent pool from which to draw as Macromedia Flash MX is used extensively by World Wide Web developers.

As those skilled in the art will appreciate, almost any type of medium-to-high bandwidth network connection may be used to connect the game server 14 to the centralized telephony server 26 and to connect the telephony servers 26 together if they're located in geographically remote regions. The connectivity between the game servers 14 and the telephony servers 26 is used to relay, in near real-time, input from game participants from the telephony servers 26 to the game servers 14 for tabulation and display.

As is well-known, a typical movie theater has many screens and it is contemplated that each of the screens will have one of the systems disclosed herein installed. It is feasible to use existing LAN technologies such as ethernet to connect all of the game servers 26 in a movie theater facility together, and then through a single connection (e.g., ISDN, DSL, T1) to the centralized telephony servers 26. This approach may simplify installations, or reduce costs, (e.g., no need to install 12 DSL lines if one has 12 game servers installed in one's facility; one DSL line will suffice).

As mentioned above, game participants use ordinary cellular telephone 16 to participate in movie games and other interactive experiences. As mentioned above, by dialing a telephone number (typically toll free) shown on screen by the game server 14 (which can vary from physical location to physical location), the participants connect to the telephony server 26. The telephony server provides audio feedback and prompting. The game participant uses his or her cell phone 16 number pad to provide input to the on-going game (e.g., by pressing 1, 2 or 3 etc.). Audio prompting may be synchronized for all participants (e.g., a narration audio track) but may also include unique content for participants (e.g., murder mystery game wherein each participant may hear unique information for their particular role). Instead of a participant using the cell phone 16 keypad, participants can speak their input and the telephony server 26 performs voice recognition thereby either eliminating or supplementing keypad use.

It is also part of a present invention to use data features of modern cellular phones to provide an even richer interactive experience, allowing directed, personalized graphics to be displayed on a player's cellular phone liquid crystal display. Technologies include WAP, j2me etc.

Software components of the embodiments disclosed herein will now be discussed. A theater-side content package runs on each game server 14 and is responsible for both presenting rich graphics, animation and text to the user as well as establishing a network connection to the telephony servers 26 to receive interactive key press (or voice recognition) data from game participants and the exchange of information stored in databases on the telephony servers. A suitable technology such as Macromedia Flash MX is preferred since it effectively handles rich content as well as the client/server TCP/IP backend. It is also a tool with which content developers are familiar.

A telephony software component runs on each telephony server 26. This software is responsible for controlling telephony hardware 24 to allow game participants to dial in and interact with the system. It is responsible for playing audio out to the participant via the participant's cell phone, possibly recording audio from the phone and interpreting DTMF key presses, and/or performing voice recognition. The telephony software is not game specific but rather a general purpose framework. The telephony servers 26 preferably include databases although the databases can be physically located on additional computers in a large scale system. These databases will be used to hold statistics for polling, high scores, etc. Anything that needs to be stored for later retrieval, either for the benefit of the interactive experience (e.g., comparing one theater's poll results to nationwide averages), or for marketing data (tracking usage, demographics, etc. for planning and sales efforts) will be kept in these databases.

A telephony-side software content package component also resides on the telephony server 26. The telephony server 26 may contain several such packages, one for each game or interactive event. This software contains pre-recorded audio (or enables synthesized audio), logic code to provide intelligence to the interactive experience, and may optionally include voice recognition patterns. The pre-recorded (or synthesized) audio may be the same for all participants at all times, or it may different for each participant depending on the scenario. Additionally, multi-lingual capability can be accommodated (although on-screen visuals will still likely be in a single language).

Audio content, speech recognition patterns, and other content related to a game or interactive experience is packaged and deployed on the telephony server 26. The telephony server 26 preferably is capable of holding a number of these content packages and having a means for different content packages to be used (either simultaneously or serially). The content packages deployed on the telephony server 26 act as half of the overall content for a particular game or interactive experience. The other half resides in the game servers 14. The content may be distributed to both the telephony server 26 and the game server 14 via a means that provides distributed and maintenance-free content deploying. Alternatively, content can be distributed by mailing media to the various theaters (e.g., CD-ROM, DVD-ROM) and having an operator manually load the content into the game server 14.

The operation of one embodiment of the invention will now be described relating to pre-movie entertainment. Before a feature film presentation begins, the game server 14 executes the content component. This operation may happen manually (operator starts it) or automatically (based on a pre-program schedule). The content component then establishes a network connection to one of the telephony servers 26 (or optionally this connection may be persistent). Once this connection has been established, interaction may begin. The telephony-side content software package launches and readies itself to accept game participants and phone lines become available for participants to dial in. Movie attendees already in the theater are enticed by on-screen instructions to use their cell phones to dial a localized telephone server 26 (this phone number can be "advertised" to the content component over the network connection so that it need not be hard-coded in the content component. This mode allows dynamic dialup bank management in which the telephony servers can assign banks for dial in numbers ad hoc and broadcast the phone number to the game servers). Game playing participants will be allowed to dial in within a window of time (e.g., one minute) before the next interactive segment begins. An option is to place callers into a waiting queue if they call outside this time window. It is contemplated that those waiting in the queue will be exposed to additional advertising or the playing of mini-games.

After participants dial into the telephony server 26 with their cell phone 16 they are prompted using audio cues played from the telephony server and heard through their cellular phones. Participants log in by identifying themselves. Several schemes for identification may be utilized, including: using caller ID information and real names from a database; having participants key in their initials or first name using telephone-alpha numeric style entry (e.g., hit "one" once for "A", hit it again for "B"). Profanity filters may be provided to avoid tasteless identifications. Participants may be allowed to select an icon or other character from a list (e.g., "do you want to be represented by the lion, bear, horse, racecar, or football?" or "what character do you want to play in this murder mystery? The butler, the maid?"). No matter which scheme is chosen, some means of each participant being able to uniquely identify him or herself will be provided. In fact, different methods can be used depending on the experience—a murder mystery may have a very different technique from a fantasy football league which may differ still from simple polling and quizzes.

When the next interactive segment begins, the theater-side software content component displays rich graphics and animations with text that present questions or other elements. At key moments on-screen instructions tell participants that they may participate in the game/poll/quiz using the key pads on their phones or by merely using their voice. Audio prompting may also be used to either reflect information that is shown on the screen or to provide additional information.

As participants key in, or speak, their answers, statistics are gathered on the telephony server 26 and sent in near real-time (or collated and sent later) to the game server 14. The telephony server 26 may collect and save these data in a database. The theater-side content software package receives the participant results and displays them in a suitable fashion (e.g., "35% of the people in this theater answered number 2," or perhaps the story arc changes depending on what participants voted).

The theater-side content software package can also retrieve results from the telephony server 26 database which reflect state-wide or nation-wide results for this particular item and visually present a comparison of this theater versus those other data sets from other theaters. Many questions or other interactive elements may take place during this interactive segment. When a segment ends, the cycle repeats until the movie previews begin (assuming that the system is being used in a pre-movie experience and not self-contained). Finally, when the interactive experience has ended, participants are reminded to turn off their phones (both on-screen and audibly) so as not to disturb other movie goers once the previews and feature film begin.

While the embodiments disclosed herein utilize cellular phones, those skilled in the art will recognize that other portable wireless devices may be utilized. Examples include wireless personal digital assistants (PDAs) or wireless game platforms such as Cybiko. In such a case, the game participants bring their wireless game devices or PDA's 40 to the theater and interact with the movie as discussed above. In this case, the game server 14 is modified to include a wireless radio system to communicate with wireless PDAs or wireless hand-held video game devices. Participants would be connected wirelessly in a localized way (rather than dialing up a central site through the public cellular telephone network). By "localized" is meant local to the screen being watched by the participant or, more generally, localized to all screens in a single theater. Connection to the telephony server may still be made in order to get access to any database stored thereon.

By employing wireless PDAs or wireless game platforms, the interaction with the game on the big screen is likely to be more "real-time" than with the cell phone embodiments discussed above. That is, this embodiment provides lower latency and could be used to give the participant the feeling of using a joystick. Individualized information can be displayed to the participants via the screens on the portable devices, and the overall game action is shown on the big theater screen.

It is recognized that modifications and variations of the invention disclosed herein will be apparent to those skilled in the art, and it is intended that all such modifications and variations be included within the scope of the appended claims.

What is claimed is:

1. A method for providing in-theater interactive entertainment, the method comprising:
   (a) displaying, by a digital projector under control of a system operating on one or more servers, a telephone number on a screen in a movie theater, the telephone number for in-theater persons to connect to a game provided by the system;
   (b) accepting, by the system, within a window of time of displaying the telephone number connections from wireless devices brought to the movie theater by the in-theater persons and which connect to the system providing the game via the telephone number;
   (c) prompting, by the system, each of the in-theater persons connected to the system via a cue communicated to each of the wireless devices;
   (d) receiving, by the system responsive to the prompting, a unique identification from each of the in-theater persons connected to the system, the unique identification communicated by input via the wireless devices;
   (e) displaying, by the digital projector, on the screen of the movie theater multimedia content of the game generated from the system to prompt participation in the game from the in-theater persons connected to the system; and
   (f) receiving, by the system, from each of the in-theater persons participating in the game input to the game via the wireless devices; and
   (g) communicating, by the system in synchrony with activity on the screen, personalized content to the wireless devices of the in-theater persons participating in the game.

2. The method of claim 1, wherein step (a) further comprises executing, by the system, a content component from a plurality of content components to establish the game from a plurality of games.

3. The method of claim 1, wherein step (a) further comprises dynamically determining, by the system upon initiating the game, the telephone number from a bank of telephone numbers.

4. The method of claim 1, wherein step (b) further comprises allowing, by the system, connections to the game during the window of time before a next game is established.

5. The method of claim 1, wherein step (b) further comprises placing in a waiting queue for a next game in-theater persons who connect to the system via the telephone number after the window of time.

6. The method of claim 1, wherein step (c) further comprises communicating, by the system, an audio cue of the game to the in-theater persons via the wireless devices.

7. The method of claim 1, wherein step (d) further comprises receiving, by the system, the unique identification for the game of an in-theater person via one or more alpha-numeric key inputs from a wireless device of the in-theater person.

8. The method of claim 1, wherein step (d) further comprises determining, by the system, the unique identification for the game of an in-theater person via caller ID information and a database of names corresponding to the caller ID information.

9. The method of claim 1, wherein step (e) further comprises displaying, by the system, on the screen of the theater instructions to instruct the in-theater persons how to participate in the game.

10. The method of claim 1, wherein step (e) further comprises communicating, by the system, to the wireless devices of the in-theater persons, audio cues for the game corresponding to multimedia content of the game displayed on the screen.

11. The method of claim 1, wherein step (e) further comprises changing, by the system, content displayed on the screen based on input from the in-theater persons received via the wireless devices.

12. The method of claim 1, wherein step (f) further comprises recognizing, by the system, voice input received from a wireless device of an in-theater person as input to the game.

13. A system for providing in-theater interactive entertainment, the system comprising:
   a digital projector under control of a game server displaying a telephone number on a screen in a movie theater, the telephone number for in-theater persons to connect to a game provided by the game server;
   a telephony server in communication with the game server accepting within a window of time of displaying the telephone number connections from wireless devices brought to the movie theater by the in-theater persons connecting to the game via the telephone number, the telephony server prompting each of the in-theater persons connected to the game via a cue communicated to each of the wireless devices and receiving from each of the in-theater persons connected to the game responsive to the prompting, a unique identification communicated by input via the wireless devices;
   wherein the game server displays via the digital projector on the screen of the movie theater multimedia content of the game generated from the system to prompt participation in the game from the in-theater persons connected to the game;
   wherein the telephony server receives from each of the in-theater persons participating in the game input to the game via the wireless devices; and
   wherein the system communicates, in synchrony with activity on the screen, personalized content to the wireless devices of the in-theater persons participating in the game.

14. The system of claim 13, wherein one of the game server or the telephony server executes a content component of a plurality of content components to establish the game from a plurality of games.

15. The system of claim 13, wherein the telephony server dynamically determines upon initiating the game the telephone number from a bank of dial up numbers.

16. The system of claim 13, wherein the telephony server accepts connections to the game during the window of time before a next game is established.

17. The system of claim 13, wherein the telephony server places in a waiting queue for a next game in-theater persons who connect via the telephone number after the window of time.

18. The system of claim 13, wherein the telephony server communicates audio cues for the game to the in-theater persons via the wireless devices.

19. The system of claim 13, wherein the telephony server receives the unique identification for the game of an in-theater person via one or more alpha-numeric key inputs from a wireless device of the in-theater person.

20. The system of claim 13, wherein the telephony server determines the unique identification for the game of an in-theater person via caller ID information and a database of names corresponding to the caller ID information.

21. The system of claim 13, wherein the game server displays on the screen of the theater instructions to instruct the in-theater persons how to participate in the game.

22. The system of claim 13, wherein the telephony server communicates to the wireless devices of the in-theater persons, audio cues for the game corresponding to multimedia content of the game displayed on the screen.

23. The system of claim 13, wherein the game server changes content displayed on the screen based on input from the in-theater persons received via the wireless devices.

24. The system of claim 13, wherein the telephony server recognizes voice input received from a wireless device of an in-theater person as input to the game.

25. A method for providing interactive entertainment via a display of a movie theater, the method comprising:
   (a) displaying, by a digital projector of a plurality of digital projectors under control of one or more systems interconnected to a plurality of movie theaters, a telephone number on a screen in a movie theater of the plurality of movie theaters, the telephone number for in-theater persons to connect to a game provided by the system;
   (b) accepting, by the system, responsive to displaying the telephone number connections from wireless devices brought to the movie theater by the in-theater persons to connect to the system providing the game;
   (c) prompting, by the system, each of the in-theater persons connected to the system via a cue communicated to each of the wireless devices;
   (d) receiving, by the system responsive to the prompting, a unique identification from each of the in-theater persons connected to the system, the unique identification communicated by input via the wireless devices;
   (e) displaying, by the digital projector, on the screen of the movie theater multimedia content of the game generated from the system to prompt participation in the game from the in-theater persons connected to the system; and
   (f) communicating, by the system in synchrony with on-screen activity, personalized content to each of the wireless devices of the in-theater persons participating in the game.

* * * * *